(12) United States Patent
Belenky et al.

(10) Patent No.: US 7,904,721 B2
(45) Date of Patent: *Mar. 8, 2011

(54) DIGITAL CERTIFICATES

(75) Inventors: Yaacov Belenky, Maaleh Adumim (IL); Chaim D. Shen-Orr, Haifa (IL); Aviad Kipnis, Jerusalem (IL); Victor Halpern, Maaleh Adumim (IL)

(73) Assignee: NDS Limited, Staines, Middlesex (GB)

( * ) Notice: Subject to any disclaimer, the term of this patent is extended or adjusted under 35 U.S.C. 154(b) by 623 days.

This patent is subject to a terminal disclaimer.

(21) Appl. No.: 12/005,523

(22) Filed: Dec. 27, 2007

(65) Prior Publication Data

US 2009/0037738 A1 Feb. 5, 2009

Related U.S. Application Data

(63) Continuation of application No. 10/545,737, filed as application No. PCT/IL03/01108 on Dec. 29, 2003, now Pat. No. 7,340,606.

(30) Foreign Application Priority Data

Jun. 23, 2003 (IL) .......................................... 156606

(51) Int. Cl.
*H04L 9/28* (2006.01)
*H04L 9/30* (2006.01)

(52) U.S. Cl. ............... 713/175; 380/28; 380/29; 380/30; 713/155; 713/156; 713/157; 713/158; 726/3; 726/4; 726/5; 726/6

(58) Field of Classification Search ................... 713/175
See application file for complete search history.

(56) References Cited

U.S. PATENT DOCUMENTS

| | | | |
|---|---|---|---|
| 5,373,561 A | 12/1994 | Haber et al. | |
| 5,717,757 A | 2/1998 | Micali | |
| 5,999,711 A | 12/1999 | Misra et al. | |
| 6,084,966 A | 7/2000 | Maebara et al. | |
| 6,233,577 B1 | 5/2001 | Ramasubramani et al. | |
| 6,298,153 B1 | 10/2001 | Oishi | |
| 6,496,929 B2 | 12/2002 | Lenstra | |
| 6,683,953 B1 | 1/2004 | Kasahara et al. | |
| 2002/0046339 A1 | 4/2002 | Bellare et al. | |
| 2002/0152385 A1 | 10/2002 | Vanstone et al. | |
| 2003/0005317 A1* | 1/2003 | Audebert et al. | 713/193 |
| 2004/0015692 A1 | 1/2004 | Green et al. | |

FOREIGN PATENT DOCUMENTS

WO  WO 01/01625 A1  1/2001

OTHER PUBLICATIONS

"NTRUSIGN: Digital Signatures Using NTRU Lattice", Apr. 2002.*

(Continued)

*Primary Examiner* — Longbit Chai
(74) *Attorney, Agent, or Firm* — Husch Blackwell LLP

(57) ABSTRACT

A method for producing a certificate, the certificate including data, the method including choosing a seed s, the seed s including a result of applying a function H to the data, generating a key pair (E,D), such that E=F(s,t), F being a publicly known function, and including s and t in the certificate. Related methods, and certificates produced by the various methods, are also described.

10 Claims, 3 Drawing Sheets

GENERATE A MODULUS N USING A SCATTERING METHOD L, A FUNCTION R, AND A SEED s, IN PART BY SCATTERING THE BITS OF R(s) THROUGHOUT N USING THE SCATTERING METHOD L, ALL BITS OF N OTHER THAN THOSE SCATTERED BY THE SCATTERING METHOD L BEING DENOTED t

INCLUDE s AND t IN A CERTIFICATE

OTHER PUBLICATIONS

Mar. 18, 2009 Office Communication in connection with EP application 03 780 595.9-2415.

Donald E. Eastlake et al., "US Secure Hash Algorithm (SHA 1)" (Network Working Group, Request for Comments 3174) (The Internet Society, Sep. 2001), available on the World Wide Web at www.ietf.org/rfc/rfc3174.txt?number=3174.

Jeffrey Hoffstein et al., "NTRUsign: Digital Signatures Using the NTRU Lattice" (Preliminary Draft 2, Apr. 2, 2002); available on the World Wide Web at: http//www.ntru.com.

A.K. Lenstra et al., "Factoring Polynomials with Rational Coefficients" Mathematische Annaleu 261, pp. 515-534 (1982); available at the World Wide Web at: http://www.springerlink.com/index/v4h8324p08422m61.pdf.

Alfred J Menezes et al., "The L3-lattice basis reduction algorithm", Handbook of Applied Cryptography, §3.10.1 (CRC Press 1996).

Alfred J. Menezes et al., "Probabilistic primarily tests", Handbook of Applied Cryptography, §4.2 (CRC Press 1996).

Phong Q. Nguyen et al.; "Lattice reduction in cryptology: An update"; available on the World Wide Web at: http://www.di.ens.fr.

R. L. Rivest et al., "A Method of Obtaining Digital Signatures and Public-Key Cryptosystems" Communications of the ACM vol. 21, Issue 2, pp. 120-126 (Feb. 1978).

"Announcing the Advanced Encryption Standard (AES)" (FIPS PUB 197) (National Institute of Standards and Technology, Nov. 26, 2001), available on the World Wide Web at: http://csrc.nist.gov/publications/fips/fips197/fips-197.pdf.

"Information technology—Open systems interconnection—The Directory: Public-key and attribute certificate frameworks" (ITU-T Recommendation X.509) (ITU Telecommunication Standardization Sector. Mar. 2000).

NRTU Cryptolab FAQs, available on the World Wide Web at: http://www.ntru.com/cryptolab/faqs.htm.

"Secure Hash Standard" (FIPS PUB 180-1) (National Institute of Standards and Technology, Apr. 17, 1995).

Apr. 3, 2009 Office Communication in connection with Chinese patent application 2003 011029X.

* cited by examiner $$v_1 = (2^{2n+L1}\ 0\ \cdots\ 0\ 0\ 0\ )$$

$$v_2 = (0\ 2^{2n+L2}\ \cdots\ 0\ 0\ 0\ )$$

$$\vdots$$

$$v_k = (0\ 0\ \cdots\ 2^{2n+Lk}\ 0\ 0\ )$$

$$v_{k+1} = (2^{2n-S1+L1}p\ 2^{2n-S2+L2}p\ \cdots\ 2^{2n-Sk+Lk}p\ 2^{n+x-z}\ 0\ )$$

$$v_{k+2} = (2^{2n}(r_1+.5)\ 2^{2n}(r_2+.5)\ \cdots\ 2^{2n}(r_k+.5)\ 0\ 2^{2n}\ )$$

FIG. 1

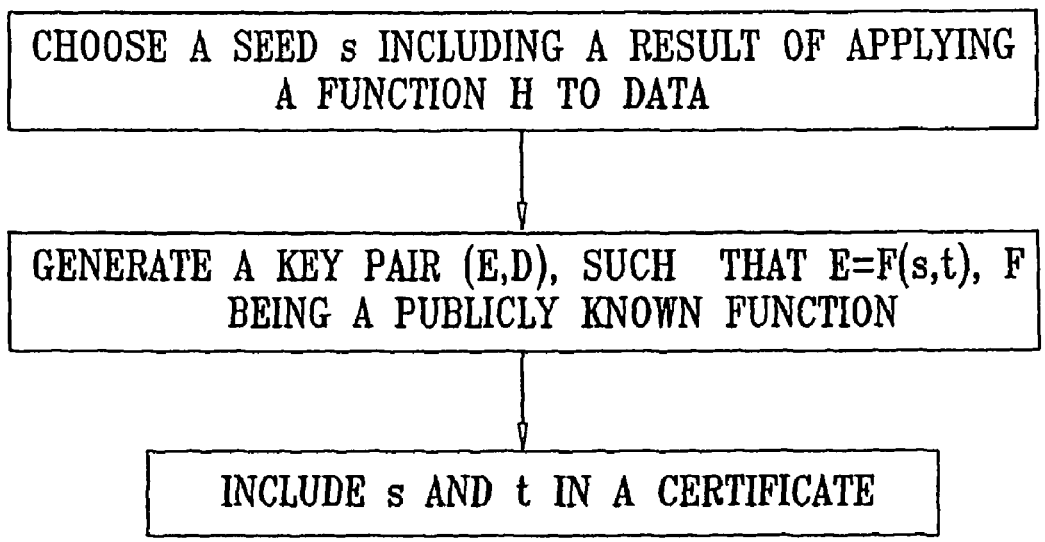
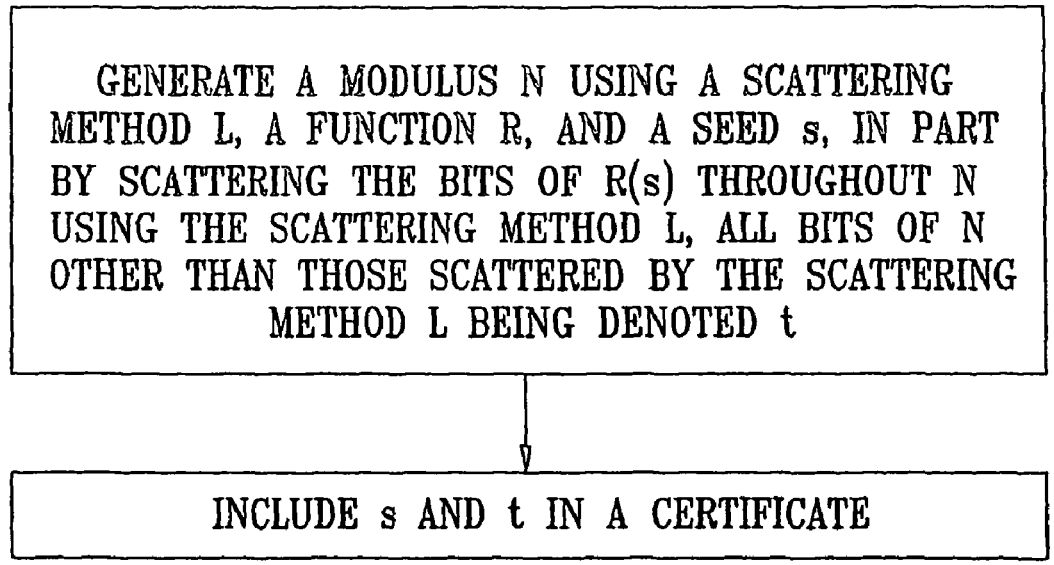

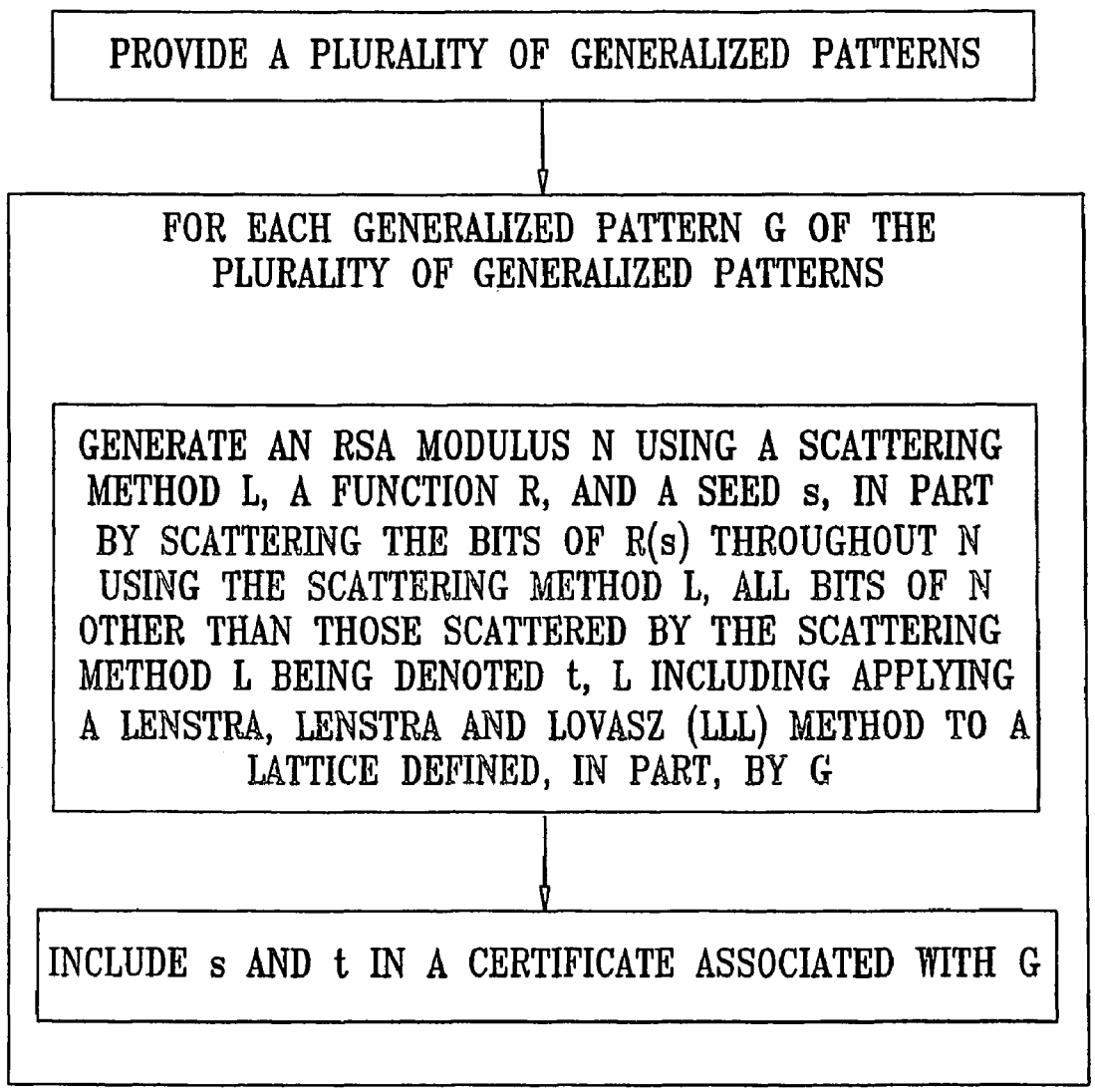

DIGITAL CERTIFICATES

The present application is a continuation of Ser. No. 10/545,737 that was a submission under 35 USC §371 of PCT/IL2003/001108, filed on 29 Dec. 2003 and entitled "Digital Certificates", which was published on 29 Dec. 2004 in the English language with International Publication Number WO 2004/114587, and which relies for priority on Israel Patent Application No. 156606, filed on 23 Jun. 2003.

FIELD OF THE INVENTION

The present invention relates to digitally signed certificates.

BACKGROUND OF THE INVENTION

The use of digitally signed certificates is well known in the art.

Consider the following example: Two entities A and B each have asymmetric key pairs, each key pair comprising a public key and a private key, as is well known in the art. Entity A is to sign a certificate for entity B, the certificate comprising the public key of entity B and other data regarding entity B.

The widespread and well known X.509 format is typically used in the prior art for the purpose of producing certificates of the type described above. The X.509 format is defined in *ITU-T Recommendation for X.509*, published March 2000, available from ITU-T (the International Telecommunication Union Standardization Sector).

The disclosures of all references mentioned above and throughout the present specification are hereby incorporated herein by reference.

SUMMARY OF THE INVENTION

The present invention seeks to provide improved digitally signed certificates and improved methods for producing digitally signed certificates.

Known solutions, as described above, do not provide optimal solutions for some applications. For example, the inventors of the present invention believe that the known solutions described above are not optimal for applications in which certificate verification is implemented in random logic, non-CPU type hardware (also termed herein "hardware"); in such applications, the inventors of the present invention believe that it is desirable for the certificate to be short and to have a form that is easy to parse in hardware. The well-known X.509 format, described above, is not good for this purpose, at least because certificates produced in accordance with the X.509 format have a variable length structure that is difficult to parse in hardware; also, X.509 format certificates are generally long, with certificates of 2 KB (kilobytes) in length being common.

The present invention, in preferred embodiments thereof, seeks to provide solutions to the problems of prior art certificates.

There is thus provided in accordance with a preferred embodiment of the present invention a method for producing a certificate, the certificate including data, the method including choosing a seed s, the seed s including a result of applying a function H to the data, generating a key pair (E,D), such that E=F(s,t), F being a publicly known function, and including s and t in the certificate. It will be appreciated by persons skilled in the art that the method may be implemented using a computer that is programmed appropriately.

Further in accordance with a preferred embodiment of the present invention the including s and t in the certificate includes including s concatenated with t in the certificate.

Still further in accordance with a preferred embodiment of the present invention the function H includes a hash function.

Additionally in accordance with a preferred embodiment of the present invention the function H includes a checksum function.

Moreover in accordance with a preferred embodiment of the present invention the function H includes adding redundancy to the data.

There is also provided in accordance with another preferred embodiment of the present invention a certificate produced by the method.

There is also provided in accordance with yet another preferred embodiment of the present invention a method for producing a certificate, the certificate including data, the method including generating a modulus N, the modulus N being generated by a scattering method L, a function R, and a seed s, N being generated, in part, by scattering the bits of R(s) throughout N using the scattering method L, all bits of N other than those scattered by the scattering method L being denoted t, and including s and t in the certificate. It will be appreciated by persons skilled in the art that the method may be implemented using a computer that is programmed appropriately.

Further in accordance with a preferred embodiment of the present invention the R(s) includes data associated with an owner of the certificate.

Still further in accordance with a preferred embodiment of the present invention the data includes an owner identifier.

Additionally in accordance with a preferred embodiment of the present invention N includes an RSA modulus.

Moreover in accordance with a preferred embodiment of the present invention L includes applying a Lenstra, Lenstra and Lovasz (LLL) method to a lattice.

Further in accordance with a preferred embodiment of the present invention the lattice is defined, in part, by a generalized pattern G.

Still further in accordance with a preferred embodiment of the present invention the lattice includes $$V_1 = (2^{2n+L1} \quad 0 \quad \ldots \quad 0 \quad 0 \quad 0)$$
$$V_2 = (0 \quad 2^{2n+L2} \quad \ldots \quad 0 \quad 0 \quad 0)$$
$$\vdots$$
$$V_k = (0 \quad 0 \quad \ldots \quad 2^{2n+Lk} \quad 0 \quad 0)$$
$$V_{k+1} = (2^{2n-S1+L1}p \quad 2^{2n-S2+L2}p \quad \ldots \quad 2^{2n-Sk+Lk}p \quad 2^{n+x-z} \quad 0)$$
$$V_{k+2} = (2^{2n}(r_1 + .5) \quad 2^{2n}(r_2 + .5) \quad \ldots \quad 2^{2n}(r_k + .5) \quad 0 \quad 2^{2n})$$

wherein n, x, z are integers, and S1, ..., Sk are position numbers of contiguous groups of symbols "*" in a generalized 2n-bit pattern G, where positions are numbered from the least significant (0) to the most significant (2n−1), and S1≧S2≧ ... ≧Sk, and L1, ..., Lk are lengths of the contiguous groups, numbered correspondingly to the contiguous groups, and p is a (n−x)-bit prime, and s is a seed, and R is a function that expands s to R(s)=r1∥r2∥...∥rk, ∥ denoting concatenation, such that, for each i, ri has a length equal to Li.

There is also provided in accordance with another preferred embodiment of the present invention a certificate produced by the method.

There is also provided in accordance with yet another preferred embodiment of the present invention method for producing a plurality of certificates, each certificate including data, the method including providing a plurality of generalized patterns, and for each generalized pattern G of the plurality of generalized patterns, performing the following steps: generating a modulus N, the modulus N being generated by a scattering method L, a function R, and a seed s, N being generated, in part, by scattering the bits of R(s) throughout N using the scattering method L, all bits of N other than those scattered by the scattering method L being denoted t, and including s and t in a certificate associated with G, wherein N includes an RSA modulus, and L includes applying a Lenstra, Lenstra and Lovasz (LLL) method to a lattice, and the lattice is defined, in part, by G, thereby producing a plurality of certificates.

There is also provided in accordance with still another preferred embodiment of the present invention a method for producing a plurality of certificates, each certificate including data, the method including providing a plurality of generalized patterns, and for each generalized pattern G of the plurality of generalized patterns, performing the following steps: generating a plurality of moduli $N_i$, each modulus $N_i$ being generated by a scattering method L, a function R, and a seed $s_i$, each $N_i$ being generated, in part, by scattering the bits of $R(s_i)$ throughout $N_i$ using the scattering method L, all bits of $N_i$ other than those scattered by the scattering method L being denoted $t_i$, and for each $N_i$, including $s_i$ and $t_i$ in a certificate associated with G, wherein $N_i$ includes an RSA modulus, and L includes applying a Lenstra, Lenstra and Lovasz (LLL) method to a lattice, and the lattice is defined, in part, by G, thereby producing a plurality of certificates.

Further in accordance with a preferred embodiment of the present invention the lattice includes $$V_1 = (2^{2n+L1} \quad 0 \quad \ldots \quad 0 \quad 0 \quad 0)$$
$$V_2 = (0 \quad 2^{2n+L2} \quad \ldots \quad 0 \quad 0 \quad 0)$$
$$\ldots \quad \ldots$$
$$\ldots \quad \ldots$$
$$\ldots$$
$$V_k = (0 \quad 0 \quad \ldots \quad 2^{2n+Lk} \quad 0 \quad 0)$$
$$V_{k+1} = (2^{2n-S1+L1}p \quad 2^{2n-S2+L2}p \quad \ldots \quad 2^{2n-Sk+Lk}p \quad 2^{n+x-z} \quad 0)$$
$$V_{k+2} = (2^{2n}(r_1+.5) \quad 2^{2n}(r_2+.5) \quad \ldots \quad 2^{2n}(r_k+.5) \quad 0 \quad 2^{2n})$$

wherein n, x, z are integers, and S1, . . . , Sk are position numbers of contiguous groups of symbols "*" in a generalized 2n-bit pattern G, where positions are numbered from the least significant (0) to the most significant (2n−1), and S1≧S2≧ . . . ≧Sk, and L1, . . . , Lk are lengths of the contiguous groups, numbered correspondingly to the contiguous groups, and p is a (n−x)-bit prime, and s is a seed, and R is a function that expands s to R(s)=r1∥r2∥ . . . ∥rk, ∥ denoting concatenation, such that, for each i, ri has a length equal to Li.

There is also provided in accordance with another preferred embodiment of the present invention a plurality of certificates, produced by the methods.

BRIEF DESCRIPTION OF THE DRAWINGS

The present invention will be understood and appreciated more fully from the following detailed description, taken in conjunction with the drawings in which:

FIG. 1 is an illustration of base vectors for a lattice in (k+2)-dimensional space, useful in understanding a preferred embodiment of the present invention;

FIG. 2 is a simplified flowchart illustration of a preferred method for producing a certificate in accordance with a preferred embodiment of the present invention;

FIG. 3 is a simplified flowchart illustration of a preferred method for producing a certificate in accordance with an alternative preferred embodiment of the present invention; and FIG. 4 a simplified flowchart illustration of a preferred method for producing a plurality of certificates in accordance with a further alternative preferred embodiment of the present invention.

DETAILED DESCRIPTION OF A PREFERRED EMBODIMENT

In accordance with a preferred embodiment of the present invention, a signer produces a certificate signed with recovery. Signatures not signed with recovery, as are well known in the art, are also termed herein "regular signatures" or "regular asymmetric signatures".

To produce a regular asymmetric signature of a certificate C, the signer computes a signature S as follows:

$$S=f(h(C),D)$$

where:
f is a publicly known function;
h is a publicly known hash function; and
D is the private key of the signer.

The signed certificate is C∥S, where "∥" denotes concatenation.

The verifier verifies that:

$$g(S,E)=h(C)$$

where:
g is a publicly known function; and
E is the public key of the signer.

Preferably, f, g, D, E are chosen as follows:
1. A set M of permitted cleartexts is defined; function f defined on the set M.
2. g(y,E) is the inverse of f(x,D), i.e. for any x∈M g(f(x,D), E)=x.
3. g, f, E are public.
4. It is difficult to find D based only on E.
5. h is chosen such that it is difficult to find different x, y such that h(x)=h(y). A non-limiting example of an appropriate choice for h is SHA-1, which is described in *FIPS PUB 180-1*, published 17 Apr. 1995 and entitled "Secure Hash Standard", available on the Internet at: www.itl.nist.gov/fips-pubs/fip180-1.htm.

The following is a non-limiting specific example of appropriate choices for f, g, D, E:

Let N=pq—an RSA number, that is, a product of two primes;
let M be the set of all integers from 0 to N−1;
let e, d be arbitrary integers such that ed=1 modulo φ(N), φ(N) being Euler's totient function;
let E be an ordered pair <N,e>;
let D be an ordered pair <N,d>;
let:

$$g(y,E)=y^e \text{ modulo } N; \text{ and}$$

let:

$$f(x,D)=x^d \text{ modulo } N.$$

For signature with recovery the signer ensures that C has some redundancy in it, or adds such a redundancy. The term "redundancy", as used throughout the present specification and claims, refers to a condition P(C) that holds for a random C with a very small probability. For example and without limiting the generality of the foregoing, the payload may be padded with a sufficiently long constant bit string, or preferably with any appropriate type of payload checksum, such types of checksum being well known in the art.

The signer then computes:

$$S=f(C,D)$$

where S is the certificate signed with recovery.

The verifier first recovers C from S:

$$C=g(S,E)$$

and then verifies that C has the pre-defined redundancy.

Persons skilled in the art will appreciate that, when using signature with recovery, signed certificates are shorter than certificates produced with regular signature. On the other hand, unlike regular signature, signature with recovery imposes a limitation on the length of C, because the set M is limited. For example, in the particular example of RSA described above, only numbers less than the modulus N may be signed with recovery. Therefore, in a certificate for B signed by A there may not be enough space in C for the public key of B and for other data; in particular, there will not be enough space in a common case where the keys of A and of B are of the same length.

In order to save space and make signature with recovery more efficient and in order to overcome the limitations mentioned above, the public key (and optionally other data) may be compressed. While data may be compressed using standard compression algorithms well known in the art, in many asymmetric algorithms the public keys generated in standard ways have high entropy. As is well known in the art, information having high entropy can not be compressed, and therefore public keys generated in standard ways can not be compressed.

The following method may be used for generation of compressible public keys:

1. Choose an arbitrary seed s.
2. Generate a key pair (E,D) in such a way that:

$$E=F(s,t)$$

where F is a publicly known function and t is some data.

For example, t may be some portion of the bits of E (such as, for example, the least significant half of E, the most significant half of E, or bits in positions scattered over E).

Any appropriate value s may be used.

Function F is preferably chosen to be a function that:

1. expands s pseudo-randomly to a pre-defined number of bits, similarly to the function of the function R described below; and
2. combines the expanded s with t in a pre-defined way (such as, for example, using the expanded s as the least significant part of the result of the combining, while using t as the most significant part, or vice versa; or in some interleaving fashion).

Instead of E, the certificate preferably includes s∥t, which is shorter than E.

A particular choice of the function F, the method of generation of a suitable key pair, and the amount of space which is saved depend on the asymmetric algorithm which is used.

Persons skilled in the art will appreciate that a certificate typically includes: credentials; characteristics; and a public key, signed all together. All the certificate fields, besides the public key, are referred to herein as "data". When one uses signature with recovery, the recovery process performs only recovery, but does not verify that the person who created the certificate knew the private key. In order to verify that the person who created the certificate knew the private key, it is necessary to have some redundancy in the clear text; that is, some pre-defined condition regarding the recovered message must be met, which condition has a sufficiently low probability for a random bit string. One option is to use a sufficiently long field (say, 16 bytes) with a fixed value. Another option is to use a checksum, or a hash, of the data. Unfortunately, both options require an additional field, so that less bytes are left for a useful payload.

To save more space, the seed s may be used as redundancy, if we set:

$$s=H(\text{data})$$

where H is a publicly known function. Thus, space is saved by double use of s, both as the checksum/hash of the data, and as a seed as described above.

Alternatively, the data itself, with some redundancy added, may be used as a seed s.

The following discussion describes a certain particularly detailed preferred implementation of the present invention, useful if the well-known prior art RSA signature scheme is used. The RSA signature scheme is described, for example, in R. L. Rivest, A. Shamir, and L. M. Adelman, "A method for obtaining digital signatures and public-key cryptosystems", *Communications of the ACM,* 21 (1978), 120-126. RSA is used by way of example only and is not meant to be limiting.

If RSA is used for signature, the public key comprises a modulus and a public exponent. The limitations on the public exponent are quite loose. In particular, the public exponent may be chosen to be a fixed publicly known number that does not to have to be explicitly included into the certificate, so there is no problem with compression of the public exponent. RSA modulus compression is believed to save about half of the length of the RSA modulus.

Several compression techniques for the RSA modulus are now described. For purposes of the following description, by way of example only and without limiting the generality of the present invention, suppose that 2n-bit RSA moduli of the form N=pq are used, where p and q are primes having n−x and n+x bits, respectively; the seed s has y bits; and R is a publicly known function that expands the seed s to n+x−z bits, where z is a parameter described below. The function R may, for example, comprise a suitable pseudo-random number generator that receives a seed s and expands it to a pseudo-random sequence. For example, the function R may set:

$$s_1=h(s), s_{i+1}=h(s_i), R(s)=s_1\|s_2\|\ldots\|s_n$$

where h comprises an appropriate hash function (for example SHA1, which is described in FIPS PUB 180-1, published 17 Apr. 1995 and entitled "Secure Hash Standard", available on the Internet at: www.itl.nist.gov/fipspubs/fip180-1.htm; and in *RFC* 3174, published September 2001 and entitled "US Secure Hash Algorithm 1 (SHA1), available on the Internet at: www.ietf.org/rfc/rfc3174.txt?number=3174), or E(x) XOR x, where E is encryption with a block cipher (for example *AES—FIPS Publication* 197, Nov. 26, 2001, *Announcing the Advanced Encryption Standard* (*AES*) available on the Internet at csrc.nist.gov/publications/fips/fips197/fips-197.pdf).

First, consider "expansion of the most significant half". The following method generates a compressible RSA key:

1. Generate an arbitrary (n−x)-bit prime p and a y-bit seed s. Methods for generating such a prime are well known in the art. In general, such methods (which are described, for example, in *Handbook of Applied Cryptography* by Alfred J. Menezes, Paul C. van Oorschot, Scott A. Vanstone, section 4.2 "Probabilistic Primality Tests") involve generating an arbitrary number having the required number of bits; testing for primality using a suitable primality test (such as Fermat's test, the Solovay-Strassen test, or the Miller-Rabin test, described in section 4.2 of *Handbook of Applied Cryptography*, referred to above); and, if the number is not prime, repeating the generating and testing until a prime number is found.

2. Set $$N_0 = R(s) * 2^{n-x+z}, q = N_0/p$$

rounded up to an odd integer. The most significant bit of $R(s)$ must be forced to 1, by setting the most significant bit of $R(s)$ to 1 even if the function R produces a 0 for the most significant bit.

3. Check q for primality, using a suitable primality test, as discussed in step 1 above. If failure (q is not prime), set q=q+2 and repeat the present step. If success (q is prime), continue to the next step.

4. Check if the $n+x-z$ most significant bits of $N=pq$ are $R(s)$. If not, repeat the method from the beginning (from step 1). If yes, N is the modulus. In compressed form, the $n+x-z$ most significant bits are replaced with the seed s, so the length of the compressed modulus is $n-x+z+y$ bits.

To make the probability of success on step 4 reasonably close to 1, z must be a little more than $\log_2(n)$, since it is known from number theory that the density of primes around N is proportional to $1/\ln N$, which means that a search for a prime number will succeed after $c \ln N$ steps in average, where c is some constant. For example, for a reasonable setting of n=1024 (2048-bit modulus), with x=z=16, y=96, the length of the compressed modulus is $n-x+z+y=1120$ bits.

Now, consider "expansion of the least significant half". The following method generates a compressible RSA key:

1. Generate an arbitrary $(n-x)$-bit prime p and a y-bit seed s.

2. Compute:

$$q = 2^{n+x-1} + (R(s)/p \text{ modulo } 2^{n+x-z})$$

The least significant bit of $R(s)$ must be forced to 1, which means that $R(s)$ is odd. Since p is odd, it is invertible modulo $2^{n+x-z}$, so q exists and is odd 3. Check q for primality. If failure, set $$q = q + 2^{n+x-z}$$

and repeat the present step. If success, continue to the next step.

4. Check if N has exactly 2n bits. If not, repeat from the beginning of the present method, at step 1. If yes, N is the modulus. In compressed form, the $n+x-z$ least significant bits are replaced with the seed s, so the length of the compressed modulus is $n-x+z+y$ bits.

The same settings mentioned above in the case of expansion of the most significant half may preferably be used.

Instead of $R(s)$ being the $n+x-z$ most significant or least significant bits of N as described above, it is possible to scatter the bits of $R(s)$ over N. In accordance with a preferred embodiment of the present invention, a preferred method for generation of such N may be based on the LLL (Lenstra, Lenstra, and Lovasz) algorithm (described, for example, in *Handbook of Applied Cryptography*, referred to above, at section 3.10.1). The LLL algorithm is also termed herein the "LLL method".

A method in accordance with a preferred embodiment of the present invention, for scattering the bits of $R(s)$ over N, using a particular application of the LLL algorithm, is now described.

Consider the following definitions:

A pattern P is a string of 2n symbols from the alphabet $\{0,1,?\}$. We'll say that a 2n-bit number N matches pattern P if and only if for every 0 in P there is 0 in the corresponding position of N, and for every 1 in P there is 1 in the corresponding position of N.

A generalized pattern G is a string of 2n symbols from the alphabet $\{*,?\}$.

A pattern P is an instantiation of a generalized pattern G if and only if for every symbol "?" in G there is "?" in the corresponding position of P.

Let G be a generalized pattern. Suppose that all the symbols "*" in G form k contiguous sequences. For any $$i, 1 \leq i \leq k$$

the i-th sequence starts from position $$S_i$$

and contains $$L_i$$

symbols "*". Positions are numbered from 0 (the least significant) to $2n-1$ (the most significant).

It is possible to assume that $$S_1 \geq S_2 \geq \ldots \geq S_k$$

(that is, the sequences are listed from the most significant part to the least significant).

In accordance with a preferred embodiment of the present invention, the following method generates a compressible RSA key for a given generalized pattern G that contains exactly $n+x-z$ symbols "*":

1. Generate an arbitrary $(n-x)$-bit prime p and a y-bit seed s, as described above.

2. Create an instantiation P of G by replacing all symbols "*" with bits of $R(s)$, in the same order. Let $$r_i$$

be the $$L_i\text{-bit}$$

sequence of bits, read as a number, that have replaced the i-th sequence of symbols "*".

3. Build a lattice in (k+2)-dimensional space, with base vectors $$V_1, V_2, \ldots, V_{k+2}$$

as shown in FIG. 1.

4. Using the LLL algorithm, find another base $$W_1, W_2, \ldots, W_{k+2}$$

for the same lattice, consisting of short vectors; a vector $(x_1, x_2, \ldots, x_n)$ is considered "short" if $x_1^2 + x_2^2 + \ldots + x_n^2$ is small. Persons skilled in the art will appreciate that the LLL algorithm is intended to find vectors that are close to the shortest ones in the lattice.

5. Verify that the (k+2)-th coordinate is not equal to zero for only one vector from the new base, and for that vector it is equal to $$2^{2n}$$

If this condition is not satisfied, repeat from the beginning of the present method (from step 1)

6. Let $$W_m$$

be the vector whose (k+2)-th coordinate is not equal to zero, and $q_i$ be the (k+1)-th coordinate of the vector $w_i$.

7. Compute $q=q_m+$(a linear combination of other $q_i$ with small coefficients)

Verify that pq matches the pattern P. If yes, check q for primality. If q is prime, N=pq is the modulus. If not, or if pq does not match the pattern, try another linear combination. If the search failed, repeat from the beginning of the present method (from step 1)

The inventors of the present invention believe that scattering of the expanded part has at least the following advantages, compared with expansion of the most significant or least significant bits:

1. Less Regular Structure of the Modulus

In case that R(s) has some regular structure, cryptographic attacks based on R(s) are less likely if bits of R(s) are scattered. An important special case in which scattering the bits is likely to be helpful in making cryptographic attack less likely is when data itself (which almost certainly has a regular structure) is used as R(s) or its part, in order to have an ID of an owner and/or other data simply embedded into his public key; embedding such data in a public key is well known in the art.

2. System Personalization

Since there are many different ways to scatter the bits of R(s) (by choosing different generalized patterns G, for example) it is possible to create multiple PKI systems that use the same algorithmic base, but are not interoperable because of difference in parameters.

Reference is now made to FIG. 2, which is a simplified flowchart illustration of a preferred method for producing a certificate in accordance with a preferred embodiment of the present invention. The flowchart of FIG. 2 is self-explanatory with reference to the above discussion.

Reference is now made to FIG. 3, which is a simplified flowchart illustration of a preferred method for producing a certificate in accordance with an alternative preferred embodiment of the present invention. The flowchart of FIG. 3 is self-explanatory with reference to the above discussion.

Reference is now made to FIG. 4, which is a simplified flowchart illustration of a preferred method for producing a plurality of certificates in accordance with a further alternative preferred embodiment of the present invention. It is noted that, in FIG. 4, reference is made to generating a single modulus N and a single associated certificate for each generalized pattern G; persons skilled in the art will appreciate that it is also possible to generate a plurality of moduli and a plurality of associated certificates for each generalized pattern G. The case of a plurality of moduli N and a plurality of associated certificates is believed to be preferred. The flowchart of FIG. 4 is self-explanatory with reference to the above discussion.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for producing a certificate, the certificate comprising data, the method comprising:
   generating a modulus N by a computer programmed to generate the modulus N by a scattering method L, a function R and a seed s, where
     N is generated, in part, by scattering bits of R(s) throughout N using the scattering method L; and
     all bits of N other than R(s) are denoted by t;
   generating a key pair (E,D) by the computer, which is programmed to generate the key pair (E,D) such that E=F(s,t), D being a private key, E being a public key, F being a publicly known function; and
   producing the certificate, including the public key E in compressed form by the computer, which is programmed to include the s and the t in the certificate instead of the public key E,
   wherein the s and the t together are shorter than the E and, wherein the public key E is generable from the s and the t.

2. The method according to claim 1 and wherein the including the s and the t in the certificate comprises including s concatenated with t in the certificate.

3. The method according to claim 1 and wherein the R(s) comprises data associated with an owner of the certificate.

4. The method according to claim 3 and wherein the data comprises an owner identifier.

5. The method according to claim 1 and wherein N comprises an RSA modulus.

6. The method according to claim 5 and wherein the generating of the modulus N includes applying a Lenstra, Lenstra and Lovasz (LLL) method to a lattice.

7. The method according to claim 6 and wherein the applying the Lenstra, Lenstra and Lovasz (LLL) method to the lattice scatters the bits of R(s) throughout N and generates t.

8. The method according to claim 6 and wherein the lattice is defined, in part, by a generalized pattern G.

9. The method according to claim 8 and wherein the lattice comprises:

$$V_1 = (2^{2n+L1} \quad 0 \quad \ldots \quad 0 \quad 0 \quad 0)$$
$$V_2 = (0 \quad 2^{2n+L2} \quad \ldots \quad 0 \quad 0 \quad 0)$$
$$\ldots \quad \ldots$$
$$\ldots \quad \ldots$$
$$\ldots$$
$$V_k = (0 \quad 0 \quad \ldots \quad 2^{2n+Lk} \quad 0 \quad 0)$$
$$V_{k+1} = (2^{2n-S1+L1}p \quad 2^{2n-S2+L2}p \quad \ldots \quad 2^{2n-Sk+Lk}p \quad 2^{n+x-z} \quad 0)$$
$$V_{k+2} = (2^{2n}(r_1+.5) \quad 2^{2n}(r_2+.5) \quad \ldots \quad 2^{2n}(r_k+.5) \quad 0 \quad 2^{2n})$$

and wherein:
   n, x, z are integers, and
   S1,..., Sk are position numbers of contiguous groups of symbols "*" in a generalized 2n-bit pattern G, where positions are numbered from the least significant (0) to the most significant (2n−1), and S1≧S2≧...≧Sk, and
   L1, ..., Lk are lengths of the contiguous groups, numbered correspondingly to the contiguous groups, and p is a (n-x)-bit prime, and R is a function that expands the s to $R(s)=r1\|r2\|...\|rk$, $\|$ denoting concatenation, such that, for each i, ri has a length equal to Li.

10. A compressed form public key delivery digital certificate for being parsed in hardware, the certificate being produced by a method comprising:

generating a modulus N by a computer programmed to generate the modulus N by a scattering method L, a function R and a seed s, where N is generated, in part, by scattering bits of R(s) throughout N using the scattering method L; and all bits of N other than R(s) are denoted by t;

generating a key pair (E,D) by the computer, which is programmed to generate the key pair (E,D) such that $E=F(s,t)$, D being a private key, E being a public key, F being a publicly known function; and producing the certificate, including the public key E in compressed form by the computer, which is programmed to include the s and the t in the certificate instead of the public key E, wherein the s and the t together are shorter than the E and, wherein the public key E is generable from the s and the t.

* * * * *